No. 818,514. PATENTED APR. 24, 1906.
D. BARTON & H. K. ACKERMAN.
WINDING MACHINE.
APPLICATION FILED JAN. 6, 1905.
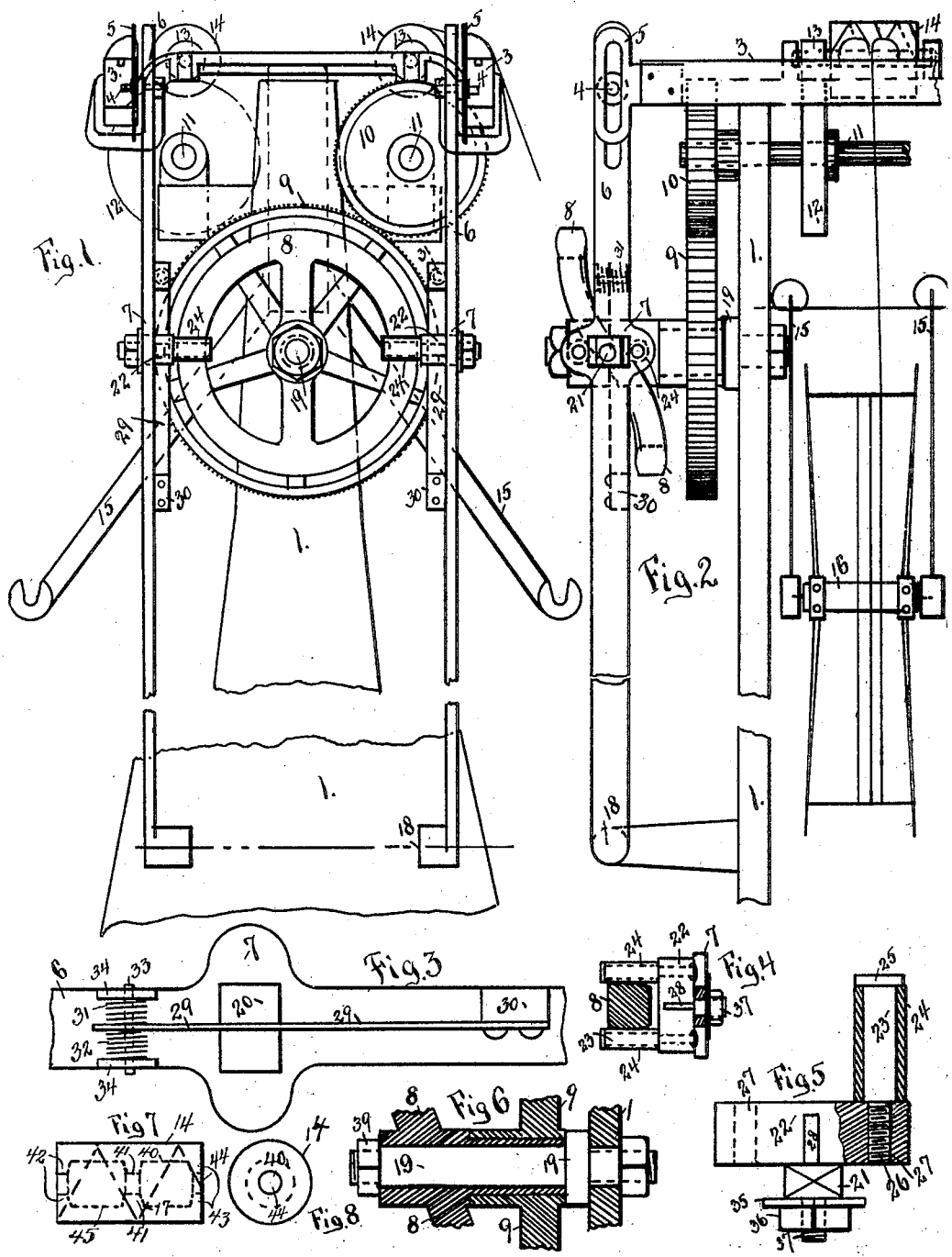
WITNESSES:
William H Terhune
Peter D Hayden
INVENTOR.
Harrison K Ackerman
David Barton
BY J. Irving Terhune
ATTORNEY.

UNITED STATES PATENT OFFICE.

DAVID BARTON AND HARRISON K. ACKERMAN, OF PATERSON, NEW JERSEY.

WINDING-MACHINE.

No. 818,514.   Specification of Letters Patent.   Patented April 24, 1906.

Application filed January 6, 1905. Serial No. 239,886.

*To all whom it may concern:*

Be it known that we, DAVID BARTON and HARRISON K. ACKERMAN, of the city of Paterson, county of Passaic, and State of New Jersey, have invented certain new and useful Improvements in Winding-Machines; and we do hereby declare that the following is a full, clear, and exact description thereof, reference being had to the accompanying drawings, and to the numerals of reference marked thereon, which form a part of this specification.

This invention relates to winding-machines, and has for its object the saving of waste in winding, the saving of time in finding the broken end of the thread on the receiving barrel or bobbin, and the preventing of jar at the ends of the traverse.

In the accompanying drawings, Figure 1 represents an end view of a winding-machine with our invention on it. Fig. 2 is a side view of Fig. 1. Fig. 3 is a view of a portion of the lever. Fig. 4 is a view of the portion fitting over the cam. Fig. 5 is a detail of the part shown in Fig. 4. Fig. 6 shows a section of the cam on its stud. Fig. 7 shows a view of the receiving-barrel. Fig. 8 is an end view of Fig. 7.

Like numerals designate corresponding parts in all the figures.

In the drawings, the frame 1 is the same as used in any ordinary winder. The spindles 13, the friction-wheels 12, the guide-rods 3, and the swifts and swift-arms 16 are the same as usually used in an ordinary winder.

On the shaft 11 a gear 10 is placed which is several times larger than the ordinary gear used to drive the traverse. This gear 10 drives the gear 9, which is located on the hub of the cam, through which the cam is made to revolve.

The lever 6 is pivoted at 18 to a bracket which is secured to the frame and is connected to the guide-rod 3 by means of the stud 4 and the bracket 5.

The cam 8 has the gear 9, sleeved over its hub securely, and has a stud 19, passing through this hub on which the cam revolves. The stud has a nut 39, screwed up to a shoulder on its end, and the cam turns between this nut 39 and the collar on this stud without more play than is necessary to allow the cam to turn freely. The stud is secured to the frame 1 by means of a nut on its end. The cam 8 has two faces which are parallel to each other.

The block 22, which connects and transmits the motion to the traverse-lever from the cam, has two holes 27, in which two studs 23, with the threaded portion 26, are inserted. On these studs are rollers 24, which revolve on the studs and are held on by the heads of the studs 25. These rollers straddle the cam 8, one of the rollers touching each face of the cam. The other portion of this block 22 has a square portion 21 on the back of it, which fits freely or in sliding contact in a rectangular opening in the portion 7 of the lever 6, so that the rollers are held in a horizontal position, or nearly so, when in motion and still have a lateral movement slightly. On the end of the square portion 21 there is a washer 35, and a nut 36 on the thread 37, the length of this square portion being such that there is just enough room to allow the movement in the slot in the lever when the nut 36 is screwed in place. In the portion 22 there is also a slot 28, which is about the size of the spring 29, which passes through it. This spring is secured by screws or rivets to the portion 30 on the lever. The upper portion of the spring 29 has a pin 33, passing through it and the lugs 34 on the lever. The pin can be secured tightly in either the hole in the spring or in the holes in the lugs 34. On each side of the end of the spring surrounding the pin 33 there is a spring 31 or 32, which assists the spring 29 in its functions.

The receiving-barrel, (shown in Figs. 7 and 8,) which goes over the rod of the spindle 13, is constructed as follows: A piece of material which has a hollow portion 40 has in this hollow portion webs or inserted bushes 43, 41, and 42, through which there are holes 44 to receive the spindle-rod. This construction makes a light receiving-barrel, merely a shell, 14 and three webs to keep it central.

As the cam revolves the rolls 24, touching both faces of the cam, are made to move back and forward. This in turn imparts motion to the lever by means of the slot and spring 29, which in turn gives the traverse required to the guide-rod 3 by means of the stud 4 and the length-regulating slots in the end of the lever 6 and the bracket 5 on the rod. The cam by means of the gears 10 and 9, revolving about once to every two or three turns or revolutions of the barrel on the spindle, causes the thread to lie on the barrel somewhat as indicated by the oblique lines, Fig. 7. The laying of the threads on the spool in this oblique manner and crossing each other in the same oblique way in traveling back again prevents the threads from running or rolling off the end of the barrel, and hence there is no need of heads on the barrel to prevent this, and, again, if an end breaks, as the threads do not run parallel around the barrel, the ends are easily picked up, thus preventing the unwinding in seeking the said broken end.

On account of the speed of the cam when the block 22 passes the high or low portion of the cam there is an inertia or dash to the guides, which would cause a jar. This is overcome by the spring 29 and the springs 31 and 32. These permit of a movement of the block 22 to one side or the other in the space 20 in the lever when the spring 29 rights itself again and takes away the jar.

Having thus described our invention, what we claim, and desire to secure by Letters Patent, is—

1. In a winding-machine, a rotatable cam, a traverse-lever having a rectangular opening, a block having a slot and a square portion which engages the opening in said lever, two rollers mounted on said block acting in sliding contact on opposite faces respectively of said cam and a flat spring secured to said lever and passing through the slot in said block for the purpose of preventing jar at the ends of the traverse.

2. In a winding-machine, a cam, means for rotating said cam, a traverse-lever, lugs on said lever, a pin mounted in said lugs, springs on said pin and means connecting said cam and lever comprising a block engaging said cam, a spring secured at one end to said lever and connected intermediate its ends with said block, and the other end of said spring engaging said pin between said springs.

3. In a winding-machine, a winding-spindle, a guide, a traverse-lever, means connecting said guide and lever, a rotatable cam and means on said lever forming a yielding connection between said cam and the lever.

Signed at Paterson, in the county of Passaic and State of New Jersey, this 16th day of December, A. D. 1904.

DAVID BARTON.
HARRISON K. ACKERMAN.

Witnesses:
   WILLIAM H. TERHUNE,
   PETER HAYDEN.